Figure 1:
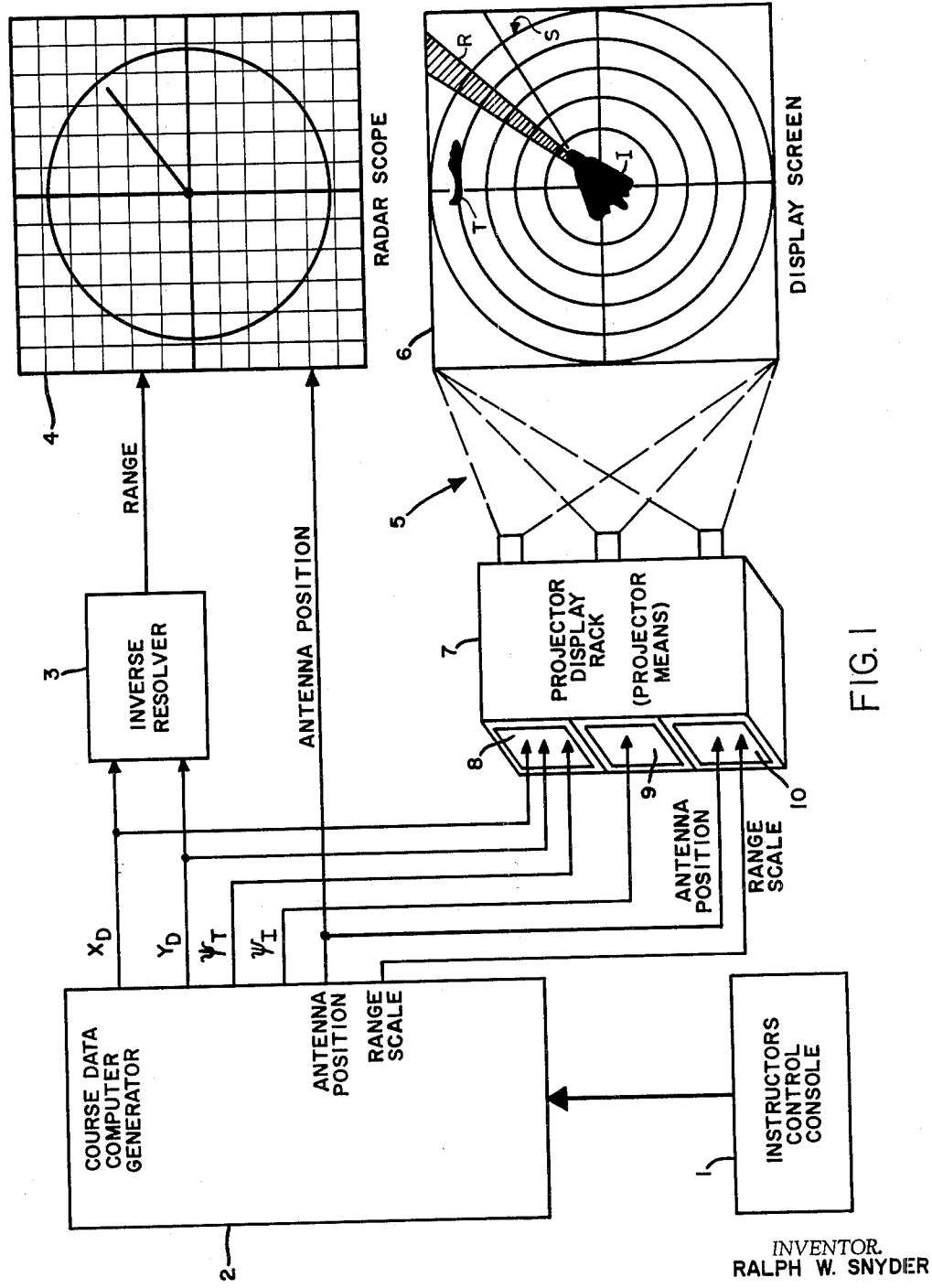

United States Patent Office
3,229,017
Patented Jan. 11, 1966

3,229,017
HORIZONTAL SITUATION DISPLAY FOR RADAR
SCOPE INTERPRETATION TRAINER
Ralph W. Snyder, Cuyahoga Falls, Ohio, assignor, by
mesne assignments, to the United States of America as
represented by the Secretary of the Navy
Filed July 11, 1963, Ser. No. 294,458
1 Claim. (Cl. 35—10.4)

This invention relates generally to a radar scope interpretation trainer, and more particularly to a situation display of a radar scope presentation associated therewith which depicts the relative positions, of two airborne craft.

Previous known devices for creating a situation display in radar scope interpretation trainers have been relatively inflexible, as for example those using mechanical means which includes a model of a craft "moving" over a chart or a map surface side by side with a simulated radar scope presentation, the latter generally using a phosphorescent representation of the aforementioned chart. The use of three-dimensional mechanical models in interpretation trainers have several disadvantages. The mechanical arrangement for positioning the model and for showing antenna direction and pattern are quite complex. Also it is difficult to locate the mechanical models in relation to the viewers in such a manner that the important angular relationships between the models and the antenna beam can be readily observed by each viewer, particularly when the viewers constitute a group of students seated in a classroom. Further when models are utilized, illumination of them is required. This is undesirable as it is preferable that the room be darkened for proper viewing of the radar scope presentation and the situation display. Finally it would be very difficult to display the range and altitude difference between several models.

Therefore, one of the objects of the present invention is to provide a device for creating a situation display in radar scope interpretation trainers which utilizes not mechanical models thereby eliminating the above enumerated disadvantages inherent in such a type of device for creating a situation display.

An object of the present invention is to provide a device for creating a situation display in radar scope interpretation trainers which is simple to construct and operate.

Another object of the invention is to provide a trainer which is flexible; that is one wherein a multiplicity of different situations may be presented at different times with a minimum of interpretation and without reconstructing the trainer each time a new situation is desired to be presented.

It is a further object of the invention to provide an improved means for graphically demonstrating the situation presented on an associated radar scope.

It is still a further object of the invention to provide a situation display of the presentation on an associated radar scope which readily illustrates all the important angular relationships existing between the objects presented on the radar scope, and which demonstrates the antenna coverage of one of the objects.

Another object of the present invention is to provide a means for creating a situation display in a trainer for; depicting the spatial relationships between a target and an interceptor during tactical manuevers, illustrating various vectoring techniques used for searching out, acquiring and tracking a target during an attack phase of a mission and for teaching viewers to obtain a metal image of a situation in space.

More specifically, it is an object of the present invention to assist pilots in the development of a metal picture of the spatial relationship of his aircraft to the target from the associated radar indicator, and to demonstrate various intercept paths.

To achieve such radar scope presentation situation displays, the radar scope interpretation trainer, utilizes a plurality of projectors, three in number, to project, on a common screen via a plurality of transparencies, four in number, the silhouette images of a simulated target bomber, a simulated interceptor, the particular radar antenna beam pattern utilized by the simulated interceptor, and a range scale. Additionally, means are provided which effectively, simultaneously and independently, vary the position and heading of each of the silhouette images coincidentally with their respective presentations on an associated radar scope.

Figure 2:
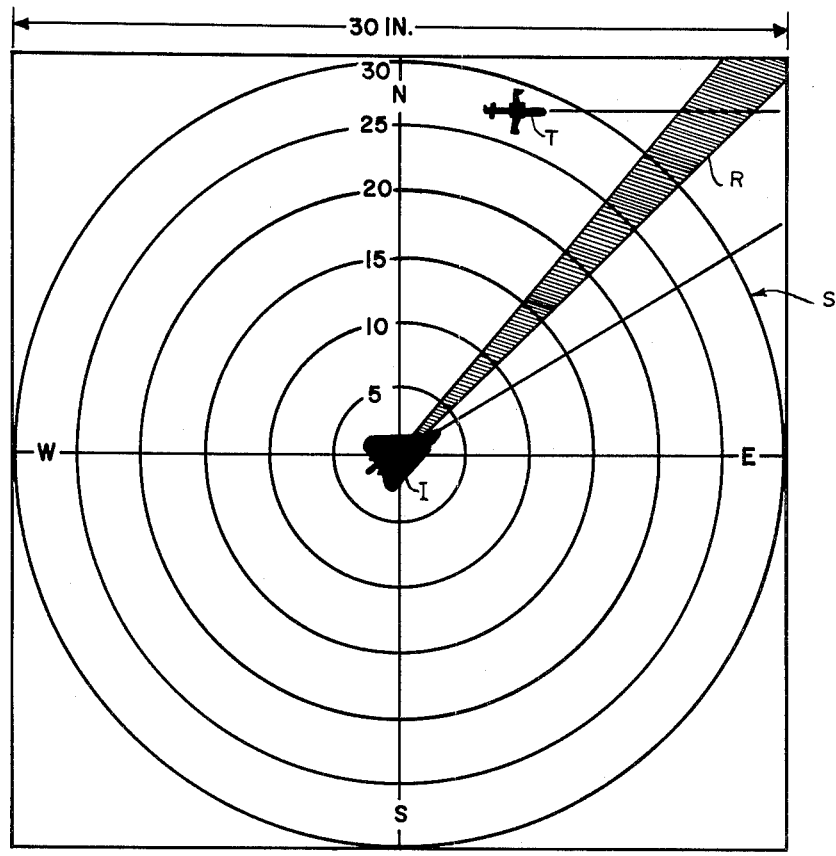
Figure 3:
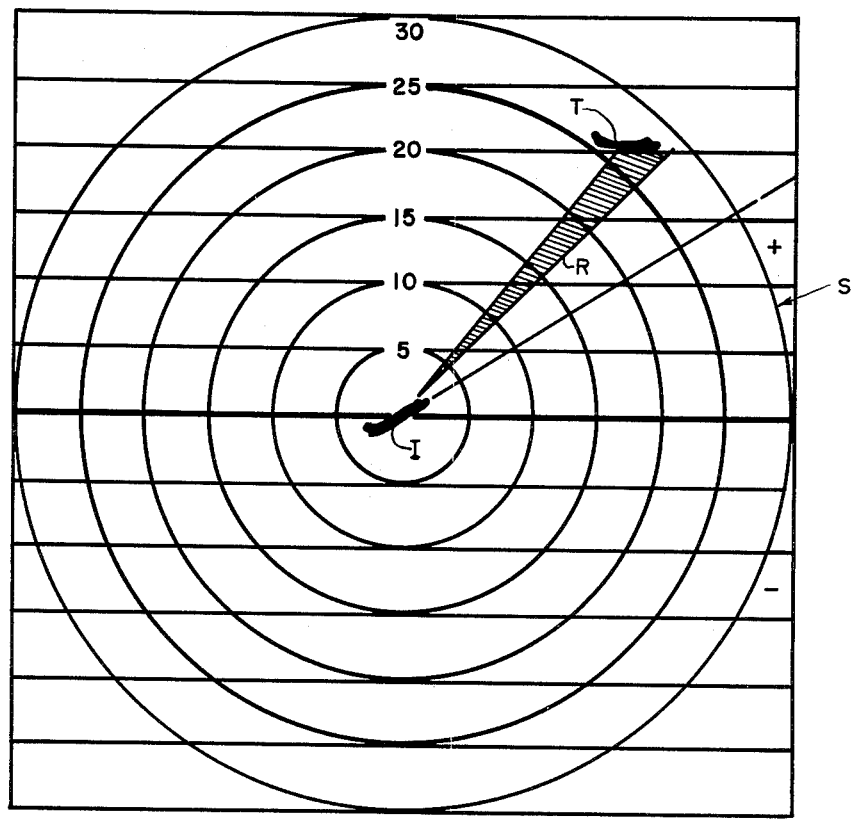
Figure 4:
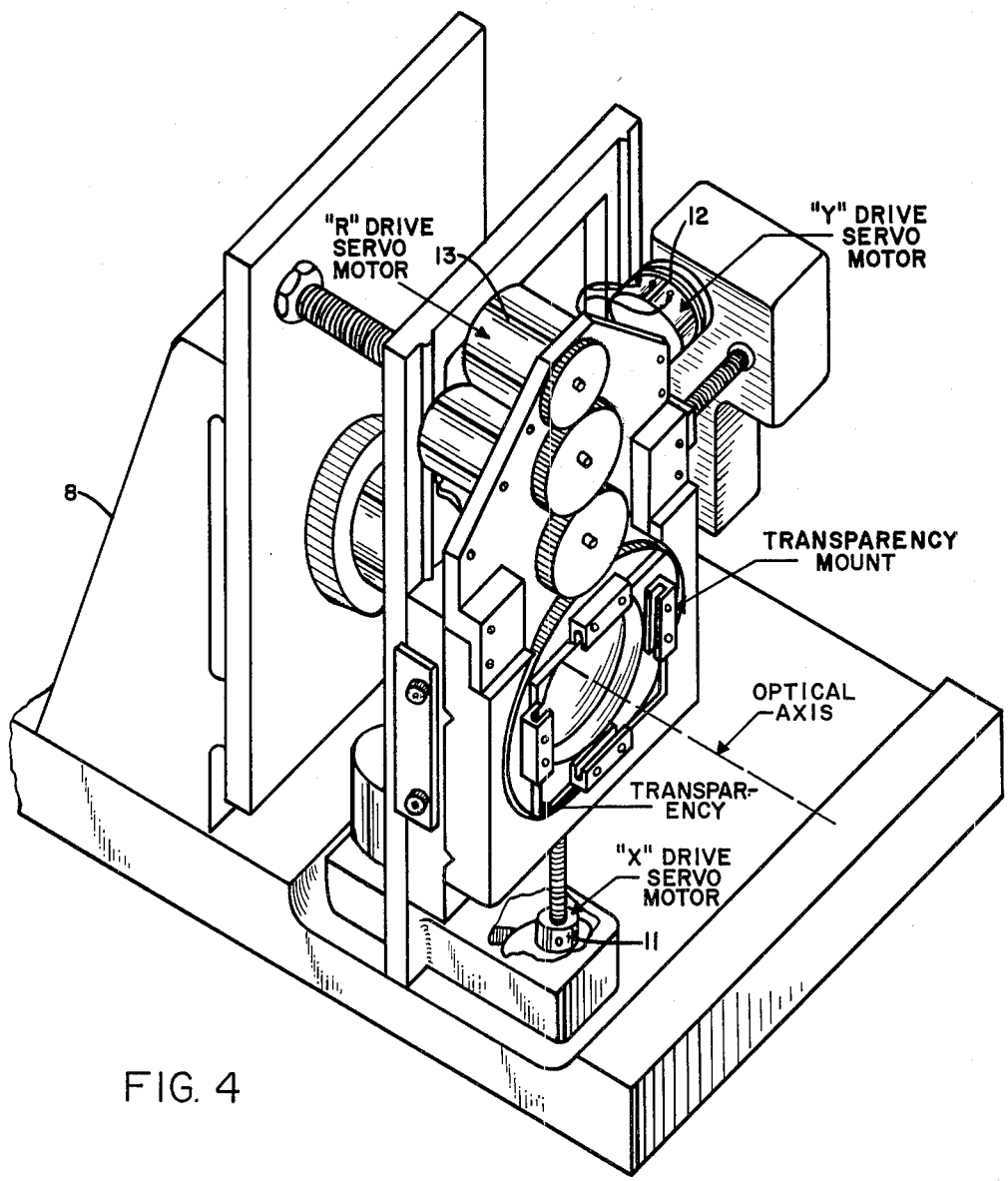

Other objects and many of the attendant advantages of this invention will be readily appreciated as the same becomes better understood by reference to the following detailed description when considered in connection with the accomapnying drawings wherein:

FIG. 1 is a functional block diagram of one form of a radar scope interpretation trainer which includes the invention, FIG. 2 shows a horizontal-situation display as viewed on a projector screen, FIG. 3 shows a vertical-situation display as viewed on a projector screen, FIG. 4 is a perspective view of one of the projectors capable of translating and rotating a slide used therewith.

Similar numerals refer to similar parts throughout the several views.

The radar scope interpretation trainer illustrated in FIG. 1 broadly comprises, a control console 1, a course data computer generator 2, an inverse resolver 3 (which may actually be a component of the computer), a radar scope means 4 of for example the plan position type, and a device 5, for creating a situation display of the associated radar scope's means presentation. An instructor stationed at the control console 1 will operate the controls thereof (not shown) in such a manner as to simulate the flight conditions of two aircraft, and more particularly the attempted simulated interception of a simulated bomber aircraft T, by a radar equipped simulated interceptor aircraft I. A conventional course data computer generator 1, electrically coupled to a conventional control console 2, and controlled thereby will provide electrical signals representing various information, such as the heading of the simulated interceptor aircraft T, it's antenna position, and the simulated target aircraft T's heading and position. These information signals are then simultaneously coupled to both the radar scope means 4, which is a conventional indicator which may for example be a cathor-ray oscilloscope having a type PPI-scan presentation with proper conversion by the inverse resolver to provide range information, and a device 5, for creating a situation display of the associated radar scope's means presentation, referred to as a "situation display means." The information signals coupled to the radar scope means 4 will result in an ordinary scope presentation. Such presentation on this radar scope means 4, in the illustrated embodiment, will be the same as that which would be presented by a plan position indicator, referred to as a "PPI" indicator, carried by the radar equipped simulated interceptor aircraft. Those information signals electrically coupled to the situation display means 5 will provide a visual indication of the information presented on the associated radar scope means 4. The visual indication provided would be similar to the display illustrated in either FIGS. 2 and 3. Silhouettes of the simulated aircraft involved T and I and the beam pattern of the radar antenna R, emanating from the simultated interceptor aircraft I, are projected on a common screen 6, with a range scale S, to provide this display. Such simulated silhouettes projected on the screen will vary in heading and position coincidentally with their respective presentations on the associated radar scope 4, which represents a radar indicator carried by the radar carrying simulated interceptor aircraft I.

The instructor's control console 1, may contain all the necessary controls and indicating devices to enable the instructor to set up, operate, and monitor typical tactical intercept problems. Such controls could include; radar scope controls, target and interceptor flight controls, and situation display means controls. Such controls would enable the instructor to "fly" the simulated aircraft T and I, to operate the simulated interceptor's radar R, to adjust the radar means 4, to control the situation display means 5. Such a console, of a kind suitable for use in the trainer, is well known in the art, making detailed description unnecessary.

The instructor's control console 1 would then be electrically coupled to the course data computer generator 2 which would provide the necessary electrical informational signals to indicate on the radar scope means 4 the apparent relative position and heading, of a simulated target aircraft T, and the position of the interceptor's radar antenna R. As the radar scope means 4 provides the same cathode ray tube presentation as that of the PPI indicator carried by the radar equipped interceptor aircraft I the position of the interceptor will be fixed at the center thereof. Seven of the electrical information signals, which are generated by the computer 2, are a function of; the simulated target's relative position, in two orthogonal coordinates, $X_D$ and $Y_D$, the simulated target T's heading $\psi_T$, the simulated interceptor I's heading $\psi_I$, the interceptor's antenna's line of sight relative to the longitudinal axis of the interceptor aircraft, and the range. These seven signals are electrically coupled to the projector display unit 7, referred to as the projector means, of the display situation means 5, thereby simulating a flight situation which is displayed on the projector screen 6, similar to that situation illustrated in FIGS. 2 and 3.

The signals simulating the targets relative position, $X_D$ and $Y_D$, and it's heading $\psi_T$, are coupled to a first optical projector means 8, which is one of the three projector means making up the projector display unit 7, and which are located in a common projector display rack.

A first slide means, which is adapted to be used with said first projector means, depicts a silhouette of a simulated bomber target T thereon, and is projected on the common sceen 6.

These aforementioned three informational signals are coupled to servo motors attached to the first projector means 8. The first two servo motors, 11 and 12, are so arranged that when the positional informational signals, $X_D$ and $Y_D$, are fed thereto, the servo motors 11 and 12 will translate the first slide in the horizontal and the vertical direction respectively, thereby changing the X, Y position of the target bomber T's silhouette on the screen as a function of the simulated bombers T position. Translation of the bomber silhouette T can also be achieved by displacing the projected light beam itself. The third information signal, representative of the simulated bomber's heading, is coupled to a third servo motor 13 capable of rotating the aforementioned first slide thereby rotating the simulated bomber's silhouette T on the screen as a function of the simulated bombers heading.

Similarly, the electrical information signal representing the heading of the simulated interceptor I is coupled to a servo motor (not shown) attached to the second optical projector means 9, which is made capable of rotating a recond slide, depicting the silhouette of a simulated interceptor aircraft I, used with said second projector means 9, to simulate the heading of the simulated interceptor's silhouette I on the projector screen 6. Thus the heading of the simulated interceptor silhouette I will be changed as a function of the simulated interceptors heading. Unlike the bomber target slide, the interceptor slide is not translated because on the embodiment illustrated a PPI indicator is used. This means that the source of the radar carrying interceptor occupies the center of the indicator screen at all times. Because of this the second slide has the simulated interceptor's silhouette I located at its center, and therefore its silhouette projected on the projection screen 6 does not move from the center thereof, but is only rotated about an axis coincident with the optical axis of the associated second projector means 9.

An information signal representing the position of the simulated interceptor's antenna R is then coupled to another servo motor, attached to the third optical projector means 10, which is capable of independently rotating a third slide used with said third projector means. This third slide, depicts thereon, a simulated silhouette of the pattern of the interceptor's antenna, such as a wedge-shaped pattern representing coverage provided by the main lobe of the antenna, and is rotated by the aforementioned servo motor as a function of the position of the interceptor's antenna. Thus, it is seen that an antenna beam pattern R emanating from the simulated interceptor aircraft is projected on the common screen 6, thereby simulating the scanning movement of the beam. Range scale slides, depicting thereon, concentric range circles and geographical reference lines, as illustrated in FIGS. 3 and 4, are provided, so that an indication of the distances between the two aircraft may be visually determined. The range scale slide S and third antenna beam pattern slide R are in tandem with, and closely positioned with one another so that a light beam will pass through both slides to the screen 6. Also, as many different antenna beam pattern slides R must be provided as there are different range scale slides S, the latter corresponding to the particular range chosen.

Range information signals from the computer 2 are coupled to the third projector means 10 to select the proper antenna beam pattern slide to be projected on the screen.

The radar scope means 4 and the display screen 6, will be so positioned that both of them will be observable at the same time.

Thus all the aforementioned silhouettes are moved by the servo motors in accordance with their respective information signals generated by the computer 1, which simulates the particular flight conditions. A movable visual display of the situation presented on the associated radar scope means 4 is thereby provided enabling a student interceptor aircraft pilot to interpret the radar scope's presentations.

FIG. 2 illustrates a typical horizontal situation display produced by the illustrated embodiment of FIG. 1. A vertical situation display, as shown in FIG. 3 could be produced, simultaneously with the horizontal situation display, or alone, by providing three other optical projectors, and associated servo motors, similar to those used to provide the horizontal situation display, with additional obvious attendent modifications. Such means would be fed by simulated information signals from a computer representing vertical parameters analogous to produce the horizontal situation display.

FIG. 4, illustrates in perspective the conventional type of optical projector means used to translate and rotate the slides used therewith, and therefore such is not described in any detail. Each optical projector, for example, may be of the Fenske, Fedrick and Miller type. Servo motors 11 and 12 are used to translate the slide, and servo motor 13, is used to rotate the same slide. The other projectors are constructed in a similar manner, and the means for automatically selecting the proper range and antenna slides, are also conventional, and therefore not shown.

Many modifications of the system illustrated in FIG. 1 are possible. For example in place of the radar scope means of FIG. 1, a simulated radar scope could be utilized, similar to the one illustrated by Hall, Patent No. 3,841,-

885 with the obvious attendant modifications. In such a case signals representing the relative position of the target in X and Y parameter could be fed, respectively to servo motors 13 and 18 of the Hall device. A signal representing the antenna position would be coupled to the servo motor 7 of Hall. This would result in reasonably realistic radar scope presentation at a lesser cost, because fewer parameters would have to be generated. However, a less sophisticated system would result. Further, if different forms of indicator presentations are desired, various obvious modification in the system illustrated for the PPI form of presentation would be required. Various conventional indicator presentations can be found in Radar System Fundamentals Navships 900,017, April 1944, pages 27 to 31, and 252, and the particular type used in this system, would, to some extent depend on the relative speed of interception. For very high speed interception a "B-scope," which displays range on the vertical axis and azimuth angle on the horizontal axis, could be expeditiously used.

Obviously many modifications and variations of the present invention are possible in the light of the above teachings. It is therefore to be understood that within the scope of the appended claims the invention may be practiced otherwise than as specifically described.

What is claimed is:

In a radar scope interpretation trainer a device for creating a situation display of a radar scope presentation comprising:

a projection screen;

a first transparency depicting at its center the silhouette and heading of a simulated interceptor;

a second transparency depicting the silhouette and heading of at least one simulated target;

a third transparency depicting the silhouette of a simulated radar antenna beam carried by said interceptor;

a fourth transparency providing a range scale for visually indicating the distance between said interceptor and target;

a first projector, having an optical axis, projecting an image of said first transparency on said screen and capable of rotating said first transparency about its center which is coincident with said optical axis;

a second projector projecting an image of said second transparency on said screen and capable of rotating and translating said second transparency.

a third projector simultaneously projecting an image of said third and fourth transparencies and capable of independently rotating said third transparency;

means for simultaneously and independently changing the position and heading of each of said rotatable and translatable transparencies coincidentally with their respective presentations on an associated radar scope.

References Cited by the Applicant
UNITED STATES PATENTS

| | | | |
|---|---|---|---|
| 2,491,308 | 12/1949 | Gordon et al. | 35—10.4 |
| 2,714,330 | 8/1955 | Frederickson | 88—24 |
| 2,782,409 | 2/1957 | Brockway | 88—24 |
| 2,854,886 | 10/1958 | Stroud | 35—10.4 X |
| 3,016,791 | 1/1962 | Van Inwagen | 88—24 |
| 3,166,974 | 1/1965 | Coti et al. | 88—24 |

CHESTER L. JUSTUS, *Primary Examiner.*

MAYNARD R. WILBUR, *Examiner.*